United States Patent [19]

Peters et al.

[11] Patent Number: 5,108,151
[45] Date of Patent: Apr. 28, 1992

[54] UPHOLSTERY SUPPORT FOR THE BACK REST OF A MOTOR VEHICLE

[75] Inventors: Siegfried Peters, Remscheid; Egon Wirtz, Remscheid Lennep; Gerhard Schmale, Huckeswagen, all of Fed. Rep. of Germany

[73] Assignee: Keiper Recaro GmbH & Co., Fed. Rep. of Germany

[21] Appl. No.: 596,949

[22] Filed: Oct. 15, 1990

[30] Foreign Application Priority Data

Nov. 2, 1989 [DE] Fed. Rep. of Germany ....... 3936418

[51] Int. Cl.$^5$ .............................................. A47C 7/02
[52] U.S. Cl. ..................................... 297/452; 297/460
[58] Field of Search ................. 297/452, DIG. 2, 460, 297/457, 440

[56] References Cited

U.S. PATENT DOCUMENTS 4,595,238 6/1986 Göldner ............................. 297/452
4,685,739 8/1987 Deegener et al. .................. 297/452

Primary Examiner—Kenneth J. Dorner
Assistant Examiner—Milton Nelson, Jr.
Attorney, Agent, or Firm—Wigman & Cohen

[57] ABSTRACT

An upholstery support for the back rest of a vehicle seat, particularly a motor vehicle seat, is disclosed. The support comprises two half-shells connected with each other along at least a portion of their edges and form two hollow box-like arms (4) which extend downward from an upper area (3) of the upholstery support, whereby at least in one of the two half-shells (2) troughs (b 6, 7, 10) are provided, the troughs (6, 7) follow two lines that cross in the upper area and end at a distance from the crossing point. Adjacent to the crossing point, the ends of at least two of the troughs (6, 7) are connected with each other by a connecting element (13) which has a trough-like central zone between two edge zones adjacent to the half-shell (1) and securely connected therewith, which central zone bridges and stiffens the trough-less intermediate space between the trough ends to be connected with each other.

12 Claims, 4 Drawing Sheets

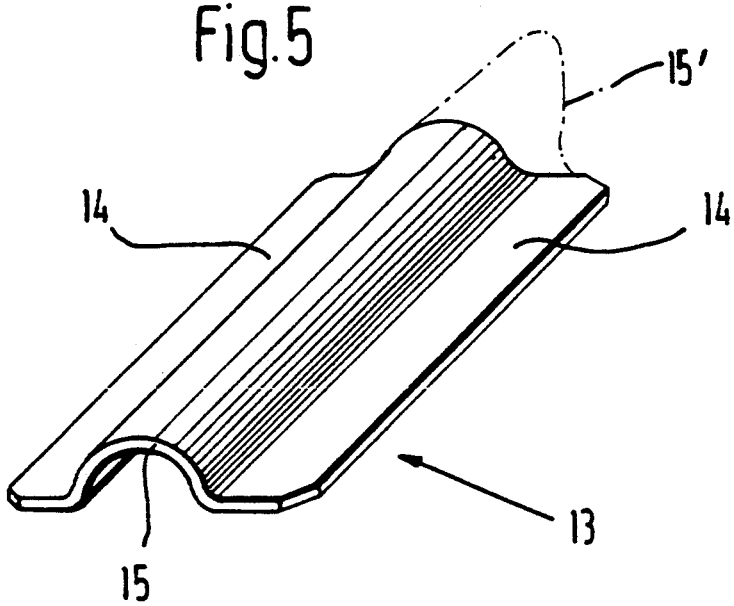
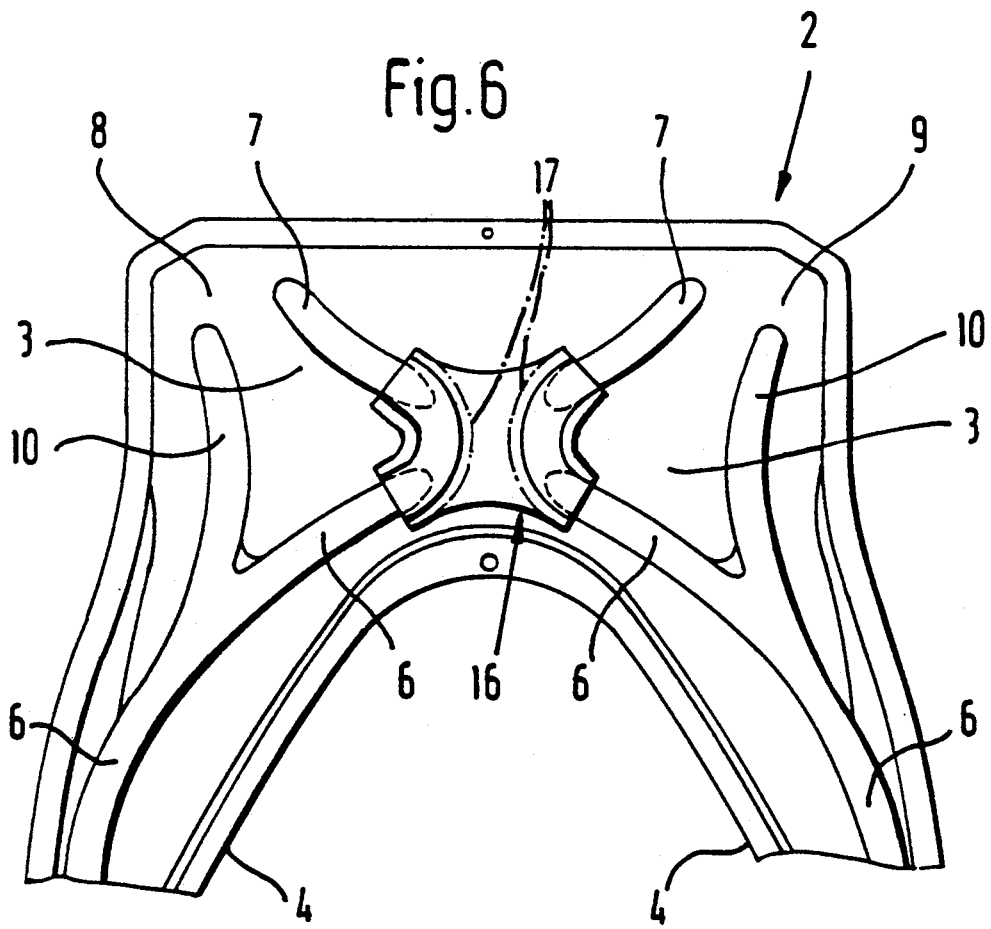

UPHOLSTERY SUPPORT FOR THE BACK REST OF A MOTOR VEHICLE

BACKGROUND OF THE INVENTION

1. Field of the Invention

The invention relates to an upholstery support for the back rest of a vehicle seat, particularly a motor vehicle seat, having two half-shells that are connected to form hollow arms which extend downwardly to form the lower ends of the upholstery support.

2. Description of the Prior Art

In a known, heavy-duty upholstery support of the aforementioned type (DE 35 21 402 C 1), uninterrupted troughs are provided in the two half-shells from the corner area into the adjacent arm.

OBJECTS AND SUMMARY OF THE INVENTION

An object of the invention is to optimize the stiffening of the upholstery support, particularly the upper portion of the support, with the smallest possible increase in expense and weight.

Another object of the invention is to provide an upholstery support having troughs for stiffening which extend in a generally diagonal direction across the upper zone of the support adjacent the upper corners thereof. Other objects and advantages will become apparent from the description which follows.

When a conventional safety belt clasp or safety belt diversion element is provided with a vehicle seat in only one of the two corner areas, at least one of the half shells should have a trough which extends from this corner area diagonally across the upper area into the arm lying on the opposite side. On the other hand, two troughs forming a cross is undesirable. To still have the option of being able to arrange either the belt connection element or the belt diversion element, i.e., for example a belt roll-up device, in one of the two corner areas, depending on whether we deal with a left or right side vehicle seat, it is possible, due to the interruption in the crossing troughs in the area where they cross, to close the space between the two troughs that lead to the corner area concerned. The connecting element stiffens the half-shell in the area of the space between the troughs in the same manner as the adjacent troughs, so that the full stiffness is achieved over the entire upper area of the half-shell. The additional weight of the connecting element is negligible, and the added expense for the connection of the connecting element to the half-shell is negligible in view of the advantage that the upholstery supports can be manufactured from identical half-shells for both the right-side and left-side seats.

The preferred cross-sectional shape of the connecting element is formed so that the inner cross-sectional shape of the connecting element is adapted to the outer cross-sectional shape of the troughs and the two ends of the central zone overlap the ends of the troughs.

If a belt connecting element or a belt diverting element is to be provided in both corner areas, it is preferred that a connection element, particularly in an arrangement of a belt connecting element or belt diverting element in each of the two corner areas, respectively, curved trough-like zones of connecting elements connect the end of a trough, which end is adjacent to the crossing point, and which trough extends into an arm with the trough that extends into the corner area located on the same side as the arm.

In one preferred embodiment, each of the two troughs emanating from the arms splits into branches out from each of the troughs that emanate from the arms and extend toward the diagonally opposite corner area, where additional branch troughs extend into the adjacent corner area. This results, in the case of a belt connecting element or a belt diverting element in only one of the two corner areas, in a stiffening of the upper area of the upholstery support by means of three troughs, and in the case of an arrangement of respective belt connecting elements or belt diverting elements in both corner areas, the result is a stiffening by means of four troughs, which leads to an optimal ratio between stiffness and weight.

It is contemplated that troughs are formed in the rear half-shell in a similar manner to that provided in the front half-shell. In many cases, however, it is sufficient to stiffen only the front half-shell.

It is preferable for both the half-shell provided with the troughs and also the connecting element to be made from sheet metal since these materials can easily be welded together over the entire length of their respective edges.

BRIEF DESCRIPTION OF THE DRAWINGS

The invention is described in greater detail below with the aid of two exemplary embodiments illustrated in the drawings, in which:

FIG. 5 is an enlarged perspective view of the connecting element of the first exemplary embodiment as shown in FIG. 3; and FIG. 6 is a partial elevational view of the exposed surface of the front half-shell of a second exemplary embodiment.

DETAILED DESCRIPTION OF THE PREFERRED EMBODIMENTS

Figure 2:
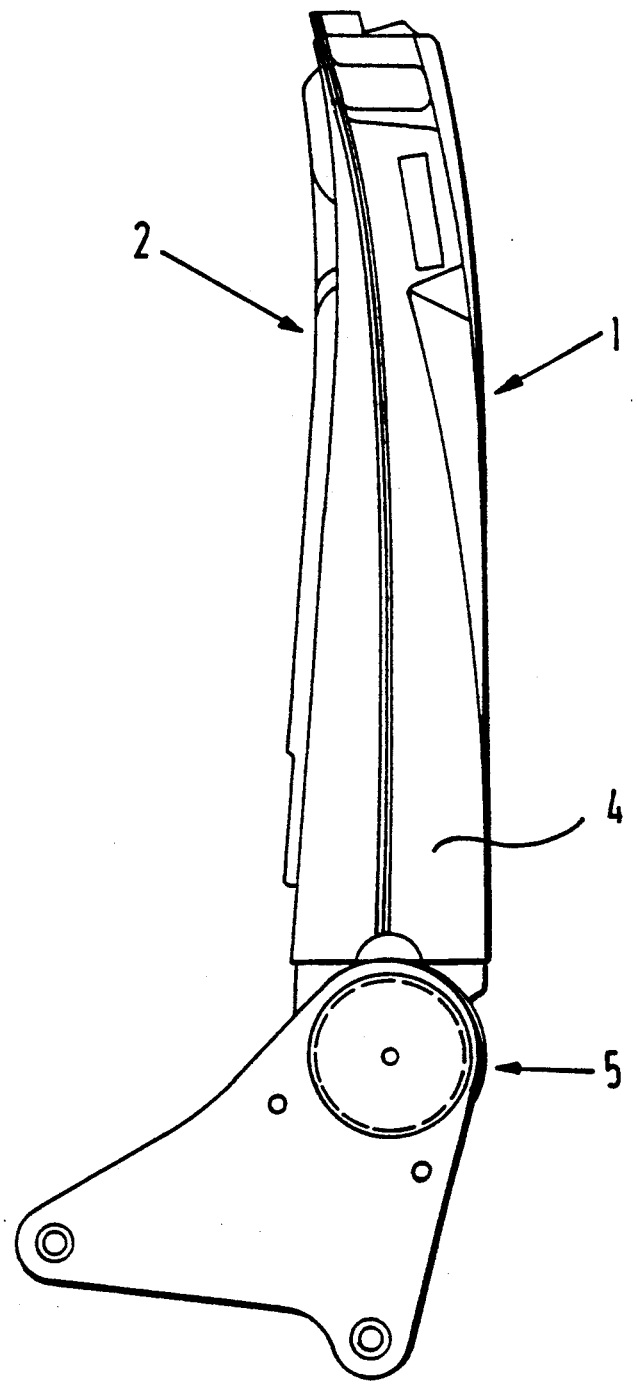
FIG. 2 is a side elevational view of the first exemplary embodiment as seen from the direction according to the arrow II in FIG. 1.

Referring now to the drawings wherein like numerals indicate like elements throughout the several views, in FIG. 2 there is shown an upholstery support for a heavy-duty back rest of a motor vehicle which includes a rear half-shell 1 and a front half-shell 2. The raised, forwardly-directed edge of the rear half-shell 1 lies with an outwardly bent flange area against the correspondingly bent flange area of the rearwardly directed front half-shell 2. These flange areas are securely connected to each other in the exemplary embodiment by welding, although other conventional techniques may be used.

Figure 1:
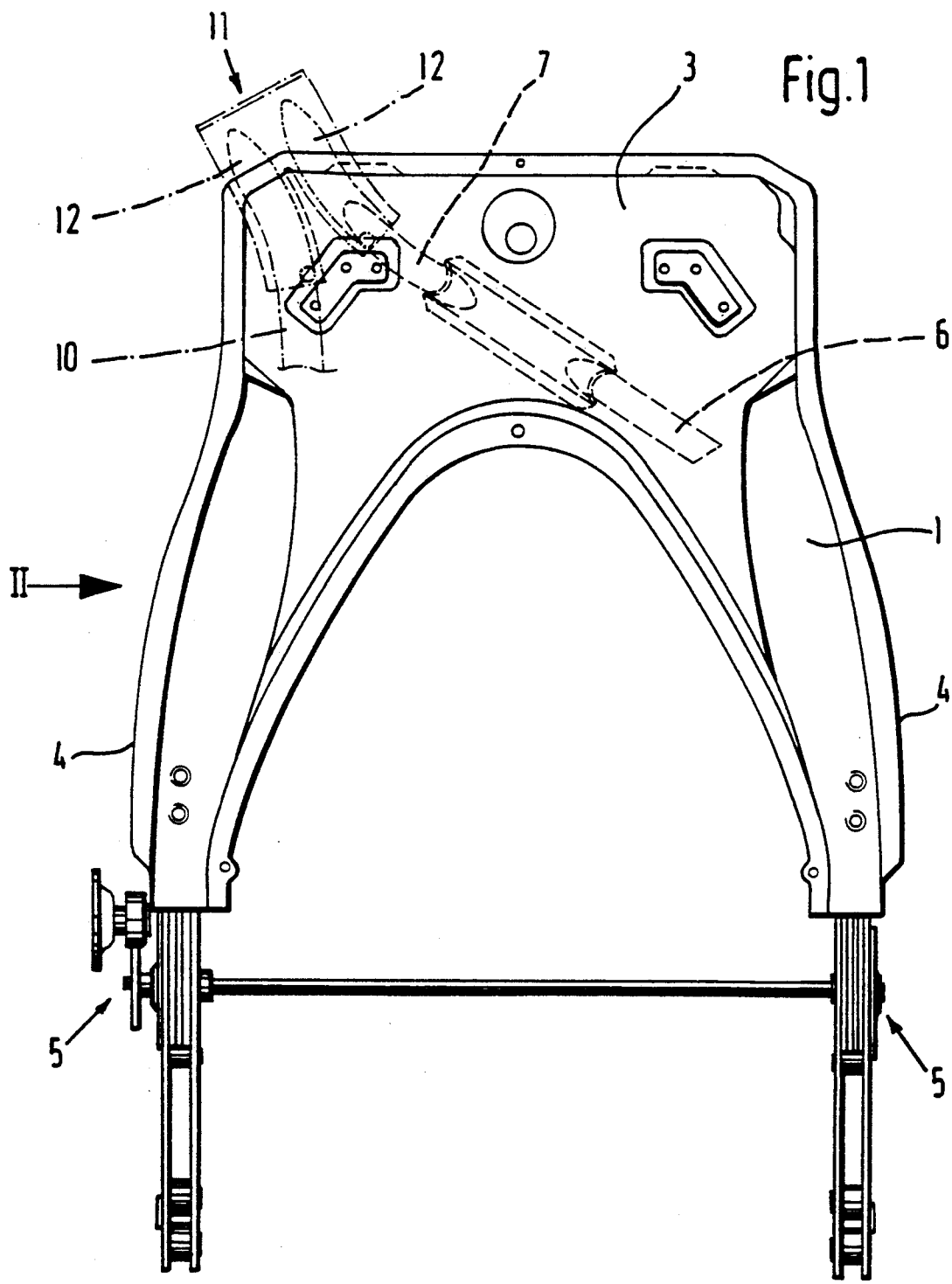
FIG. 1 is a rear elevational view of the first exemplary embodiment.

As shown in FIG. 1, the two half-shells 1 and 2, which in the exemplary embodiment are made of sheet steel, form a shoulder-level rectangular upper area 3 of the upholstery support, from which there extend two arms 4 which increase in their distance from each other as they extend downward. Arms 4 are in the shape of a hollow box, similar to the upper area 3. The lower end of the two arms 4, which are formed symmetrically to the center plane of the upholstery support, from the lower end of the upholstery support. The lower ends of arms 4 are pivotably connected to the seat frame by a pair of heavy-duty hinge fittings 5.

Figure 3:
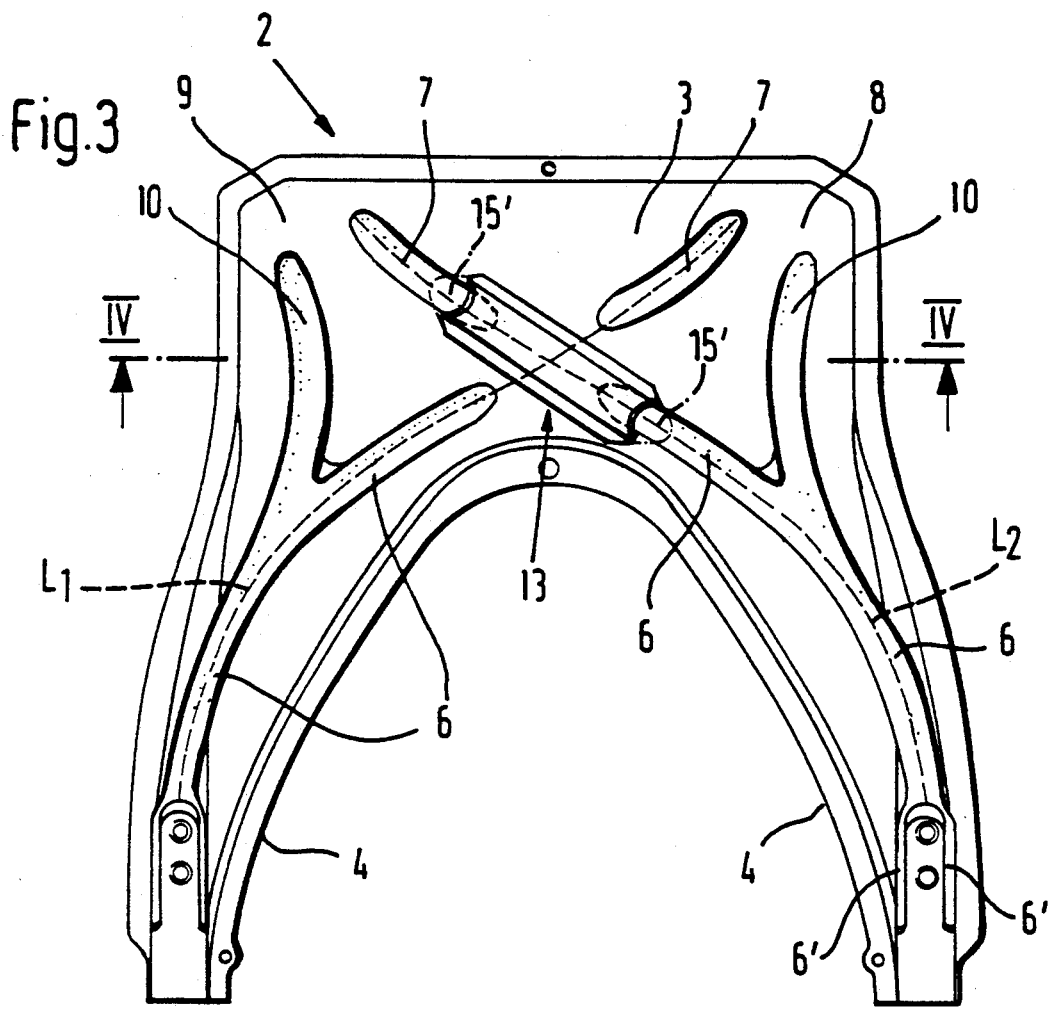
FIG. 3 is an elevational front view showing the exposed surface of the front half-shell of the first exemplary embodiment.

As seen in FIG. 3, in contrast to the rear half-shell 1, which is basically stiffened only by its raised edge, the front half-shell 2 is provided with numerous troughs which extend beyond the side opposite the rear half-shell 1. These troughs run symmetrically relative to the longitudinal central plane. Respective first troughs 6 and second troughs 7 extend along two different lines, shown as broken lines $L_1$ and $L_2$. One line $L_1$ begins near the lower end of the arm shown at the left of FIG. 3, and extends approximately in the longitudinal direction of the arm near the center thereof, and then passes diagonally across the upper area 3 to the corner area 8 illustrated on the right side of FIG. 3. The other line $L_2$ begins near the lower end of the other arm 4, extends in the longitudinal direction of this arm and finally passes diagonally across the upper area 3 to the corner area 9 illustrated at the left in FIG. 3. The first two troughs 6 end at a distance from the crossing point of the two lines $L_1$ and $L_2$ lying in the upper area 3. The ends of the second two troughs 7 facing the crossing point lie approximately equidistant from the crossing point. These two troughs both, as a result of a slight bending, point toward a location on the upper edge of the upholstery support that is displaced somewhat toward the center relative to the corner. Respective third troughs 10 branch upward from the two first troughs 6 shortly before exiting the arm 4. These third two troughs 10 extend, aside from a slight curvature, approximately parallel to the side edge of the upholstery support toward the adjacent corner area 8 or 9. The distance of the third trough 10 from the adjacent second trough 7 decreases toward the upper ends of these troughs. The free ends, however, still are spaced from each other by a distance that is clearly greater than the width of these troughs 7 and 10.

The lower ends of each of the two troughs 6 split in a fork-like manner into two spaced apart and parallel adjacent troughs 6', between which the portion of the hinge fitting 5 to be connected with the arm 4 engages. This avoids an interruption in the stiffening of the arms at the transition to the hinge fittings 5.

Depending on whether the upholstery support is associated with a seat that will be positioned on the left or right side of the vehicle, a belt connecting element or belt diverting element is secured to the back at the left or right corner area 9 or 8. The belt diverting element shown in the exemplary embodiment is a belt roll-up device. Shown in broken lines in FIG. 1 is a receptacle 11 for the belt roll-up device. This receptacle 11 has a base plate which is provided with two adjacent troughs 12, which cross and there join the second trough 7 and the third trough 10, respectively. In this manner the stiffening of the upper portion 3 is accomplished all the way to the edge of the corner area.

Figure 4:
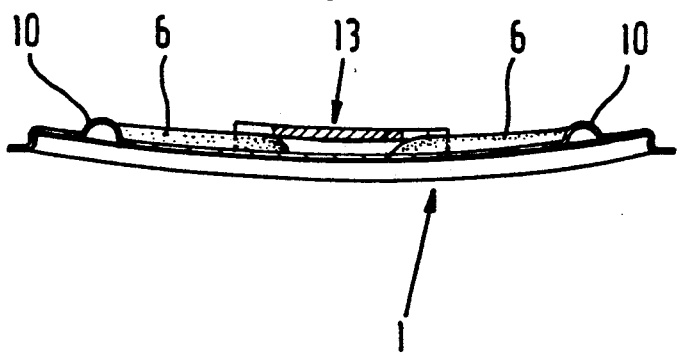
FIG. 4 is a sectional view taken along the line IV—IV of FIG. 3.

The receptacle 11 is attached on the left side corner area 9. The intermediate space between the second trough 7 that projects into the left corner area 9 and the end of the first trough 6 that is directed toward this trough 7 is bridged by means of a connecting element designated generally by numeral 13 (FIG. 3). Connecting element 13 also is made of sheet steel and has, as indicated in FIG. 5, two parallel rectangular edge zones 14, the full surfaces of which can be placed against the front half-shell 2. A trough-like central zone 15 is provided between the two edge zones 14, the inner cross-sectional shape of which is adapted to the outer cross-sectional shape of the first trough 6 and the second trough 7, all of which have an identical cross-sectional shape at least in the adjacent end sections. As shown in FIGS. 1,3,4, the length of the connecting element 13 is somewhat larger than the space between the troughs 6 and 7 which follow the same line. Therefore, when connecting element 13 the two end sections are positioned over troughs 6,7 of the central zone 15 overlap the ends of the troughs 6 and 7 to bridge the space therebetween. As a result of the welding of the connecting element 13 to the rear half-shell 1, a stiffening of this half-shell 1 is achieved which is just as great as if the first trough 6 were to extend into the corner area 9 without interruption.

As illustrated in FIG. 5, extensions 15' may be provided at one or both ends of the central zone 15, with tongue-like extensions, as illustrated by broken lines. Extensions 15' of this type, which further increase the stiffness effect of the connecting element 13, are also shown in FIG. 3.

Where the receptacle 11 is attached in the right side corner area 8 as viewed in FIG. 1, then the intermediate space between the second trough 7 that projects into this corner area 8 and that of the first trough 6, which follows the same line, is bridged by the connecting element 13. Therefore, with identically formed half-shells, an optimal stiffening can be achieved regardless of whether the belt roll-up device is arranged in the left or right corner area 9 or 8. The area 3 of the front half-shell 2 is always stiffened by three troughs, which are positioned optimally for the loads they encounter.

The front half-shell 2 can also be used when belt roll-up devices are secured in both corner areas 8 and 9. As shown in FIG. 6, this would require a connecting element 16 with two bow-like curved troughs which, like the connecting element 13 in the exemplary embodiment, is preferably made of sheet steel and has two trough-like central zones between two edge zones. The four end sections of the trough-like central zones of the connecting element 16 overlap the ends of the first trough 6 and the second trough 7 to be connected together, as illustrated in FIG. 6. Because the connecting element 16 is welded with the front half-shell 2, the achieved stiffening effect of the front half-shell 2 is just as great as if the two first troughs 6 were to extend without interruption at the end of a curve into the corner areas 8 and 9, which curve is arranged above the referenced arm 4.

As shown in FIG. 6 by the two broken lines 17, instead of the connecting element 16 having two trough-like central zones, two separate connecting elements could also be provided, the adjacent edges of which extend along the lines 17.

Although only preferred embodiments are specifically illustrated and described herein, it will be appreciated that many modifications and variations of the present invention are possible in light of the above teachings and within the purview of the appended claims without departing from the spirit and intended scope of the invention.

What is claimed is:

1. An upholstery support for the back rest of a vehicle seat comprising:
   a front and rear shell joined along confronting edges;
   means for securing a safety belt in an upper corner of one of said shells;

at least one stiffening trough formed in one of said shells which extend in a generally diagonal direction from the bottom of said shell upwardly into an opposite corner thereof, said trough having an interruption near a central portion of said shell;

a connecting element having a trough forming shape bridging said interruption of said trough;

whereby said shell is stiffened to the same extent as though said trough was not interrupted.

2. Upholstery support for the back rest of a vehicle seat, particularly a motor vehicle seat, comprising:

a) two half-shells each having an edge, each said half-shell connected with the other said half-shell along at least a portion of the edges of said two half-shells to form two hollow box-like arms which extend downward from an upper portion of said upholstery support, said upper portion forming two corner areas and said arms each having free ends which form a lower end of the upholstery support, each said arm associated with an adjacent corner area and diagonally aligned with an opposite corner area;

b) attachment points for one of a belt connecting element and a belt diverting element located in each of said two corner areas of said upper portion of said upholstery support;

c) one of said two half-shells including at least a pair of troughs that extend into said two arms and said two corner areas; said troughs interrupted to form a trough-less intermediate space, each said trough following a line extending diagonally from one said arm to one said corner area, said lines crossing in a crossing point in an area of said upper portion of said upholstery support and each said trough having ends located at a distance from said crossing point, and d) a connecting element positioned adjacent to said crossing point of said ends of at least two of said troughs; said connecting element having a central zone between two edge zones, said edge zones located adjacent to said one half-shell and securely connected therewith, which central zone bridges and stiffens said trough-less intermediate space between said trough ends to be connected with each other.

3. An upholstery support according to claim 2, wherein an inner cross-sectional shape of said central zone of said connecting element is adapted to conform to an outer cross-sectional shape of said half-shell troughs, corresponding to a cross-sectional contour defined by a convex curved surface of said troughs, to form a central trough, said two ends of said central trough overlapping said ends of said half-shell troughs.

4. An upholstery support according to claim 2, wherein said front half-shell includes said troughs.

5. An upholstery support according to claim 4, wherein said half-shell provided with said troughs and said connecting element are made of sheet steel.

6. An upholstery support according to claim 5, wherein said connecting element is welded to said half-shell over the entire length of said edge zones.

7. An upholstery support according to claim 2, wherein an additional trough branches out from each of said troughs that emanate from said arms and extend toward a diagonally opposite corner area, each said additional branch trough extending into an adjacent corner area associated therewith.

8. An upholstery support according to one of claims 2-7, wherein said connecting element connects an end of a corner trough, which corner trough extends into a corner area provided for arrangement of one of said belt connecting element and belt diverting element with an end of an arm trough which arm trough extends into said end of said arm lying diagonal to said corner area.

9. An upholstery support according to one of claims 2-7, wherein curved, trough-like zones of a pair of connecting elements each connects an end of an arm trough, which end is adjacent to said crossing point, and which arm trough extends into an arm, with an end of a corner trough, which end is adjacent to said crossing point and which corner trough extends into an adjacent corner area located on a side corresponding to a side where said arm is located.

10. An upholstery support according to one of claims 2-7, wherein said troughs extend in respective lower end sections into two fork-like parallel troughs, for receiving a connecting fitting.

11. An upholstery support according to claim 10, wherein said connecting fitting is positioned in each of said fork-like troughs for pivotably securing said arms to said seat frame.

12. An upholstery support according to one of claims 2-7, wherein a single connecting element comprises a pair of curved, trough-like zones, each said zone connects an end of an arm trough, which end is adjacent to said crossing-point, and which arm trough extends into an arm, with an end of a corner trough, which end is adjacent to said crossing point and which corner trough extends into an adjacent corner area located on a side corresponding to a side where said arm is located.

* * * * *